May 5, 1953     C. F. HAMER     2,637,449
TRANSMISSION JACK
Filed Feb. 6, 1950     2 SHEETS—SHEET 1
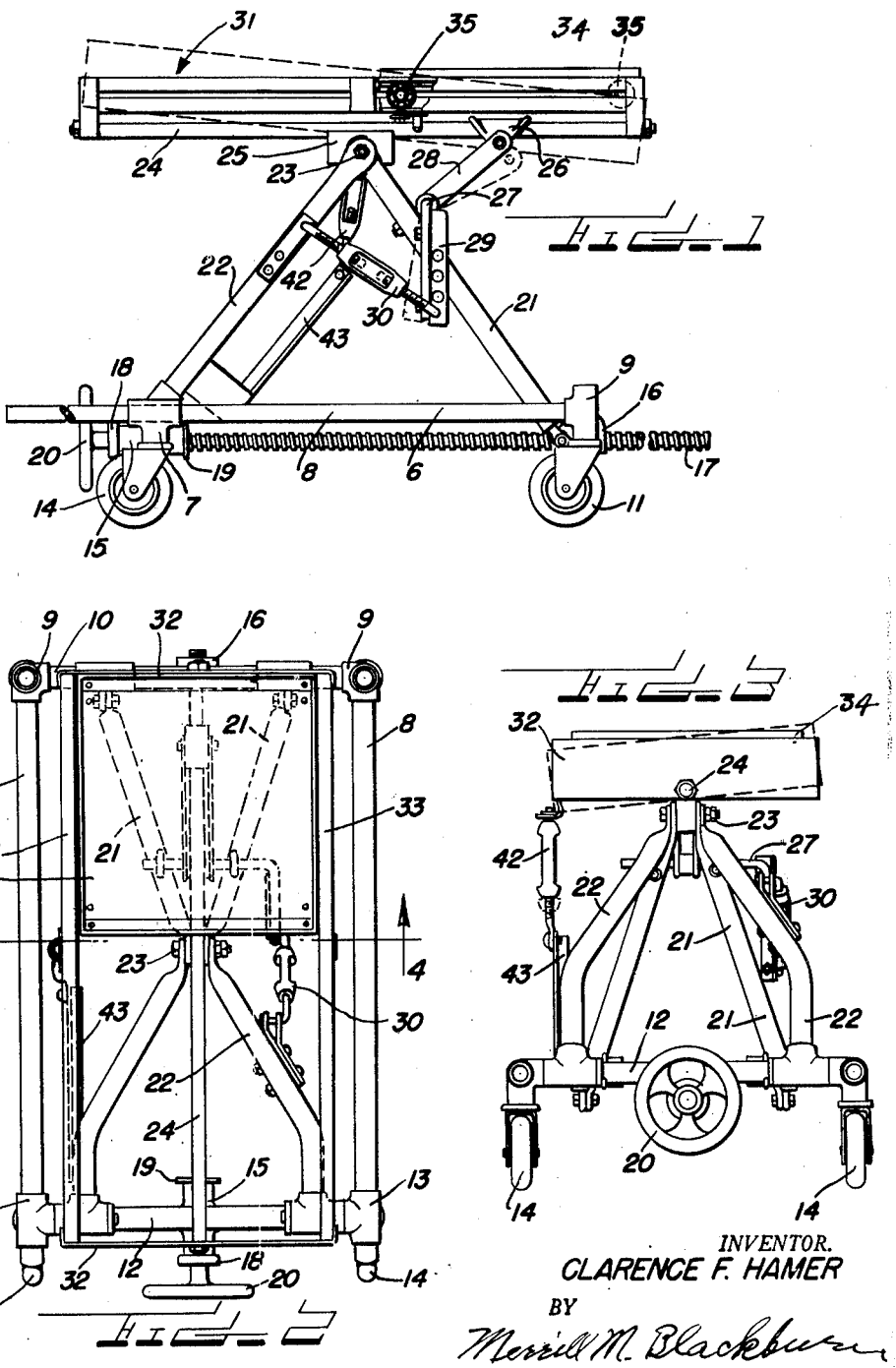
INVENTOR.
CLARENCE F. HAMER
BY
Merrill M. Blackburn
ATTORNEY May 5, 1953　　　　C. F. HAMER　　　　2,637,449
TRANSMISSION JACK
Filed Feb. 6, 1950　　　　　　　　　　2 SHEETS—SHEET 2
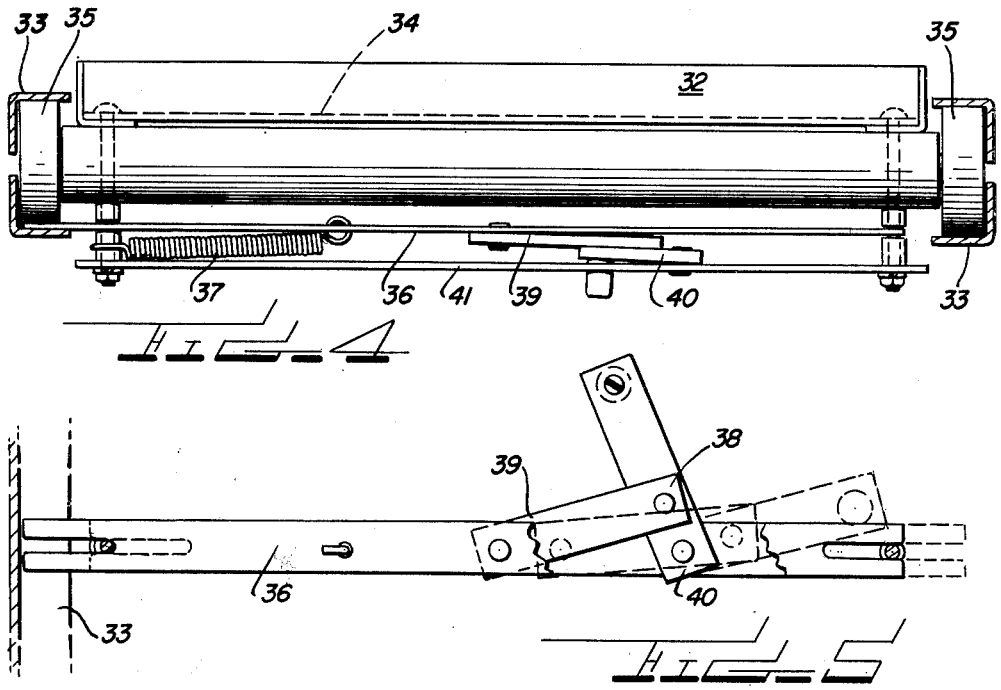
INVENTOR.
CLARENCE F. HAMER
BY
Merrill M. Blackburn
ATTORNEY Patented May 5, 1953

2,637,449

UNITED STATES PATENT OFFICE 2,637,449

TRANSMISSION JACK

Clarence F. Hamer, Iowa City, Iowa

Application February 6, 1950, Serial No. 142,574

4 Claims. (Cl. 214—1)

The present invention relates to automotive repair equipment, in particular, to hoists. Hoists for positioning parts of cars from above have been in use for many years and are very satisfactory. However, when it is desired to install or remove heavy parts from the under side of automobiles, trucks, or tractors, this can be accomplished to advantage with the present equipment.

Among the objects of the present invention are the provision of hoists for working from below on automotive vehicles; the provision of hoists which are simple in design and sufficiently rugged that they will not get out of order in a long life of heavy use; the provision of hoists for operation from below a vehicle, which provide for angular adjustment of the part hoisted in order to effect accurate positioning; and such further objects, advantages, and capabilities as will hereafter appear and as are inherent in the structure disclosed herein and covered by the appended claims.

A preferred form of the present invention is shown in the accompanying drawings, in which drawings, Fig. 1 is an elevation of the present hoist or jack in partially elevated position;

Fig. 2 is a plan thereof in lowered position;

Fig. 3 is an end elevation thereof from the left end of Fig. 1;

Fig. 4 is a section of the table on the plane indicated by the line 4—4 in Fig. 2; and Fig. 5 is a detail of the locking mechanism for holding the table in adjusted position.

Reference will now be made in greater detail to the annexed drawings for a more complete description of this invention. In the preferred embodiment shown, this hoist or jack comprises a base equipped with wheels. The base is composed of a U-shaped frame 6 and a frame section 7 slidable on the frame 6 which is formed of a pair of arms 8, connected by elbows 9 to the opposite ends of a rod 10. Each of elbows 9 has secured therein a castor 11. The frame section 7 is constituted of a bar 12 which has a transverse tubular member 13 secured at each of its ends. These tubular members 13 are of a size and are so spaced that they are slidable upon the parallel pair of arms 8 of the frame 6. The tubular members 13 are likewise provided with castors 14, similar to castors 11. The two pairs of castors, 11 and 14, provide for mobility of this hoist or jack.

The rod 10 of the U-shaped frame 6 and the bar 12 of the frame section 7 are rigidly mounted at their ends to prevent rotation. A collar 15 is secured to the under side of the bar 12, transversely thereof, at its mid-point. A second collar 16, in alignment with the collar 15, is secured to the under side of the rod 10. The collar 16 is internally threaded, and a threaded shaft 17 extends through the collar 16 in screw-threaded engagement therewith. The shaft 17 extends, also, through the collar 15 and is provided with a shoulder 18 to abut against the end of the collar 15 remote from the collar 16. The shaft 17 is free to turn in the collar 15 but is held against movement therethrough toward the collar 16 by the shoulder 18. A second shoulder 19 is secured on the shaft 17 at the end of the collar 15, nearest to the collar 16. This shoulder 19 prevents movement of the shaft 17 through the collar 15 away from the collar 16. A hand wheel 20, or other means of turning, is provided on at least one end of the shaft 17.

Thus, the frame section 7 is caused to translate forwardly and backwardly along the arms 8 of the frame 6 upon turning of the shaft 17, since the shaft is threadedly engaged in the collar 16 and is non-translatably engaged in the collar 15.

Two pairs of arms 21 and 22 are pivotally mounted on each of the rod 10 and the bar 12, respectively, and the ends of each of arms 21 and 22, remote from the rod 10 and the bar 12, are provided with an opening through which is placed a bolt 23. The ends of the arms 21 and 22 are accordingly pivotally connected. A bar 24 is provided with a flange 25 which is pivotally mounted on the bolt 23.

Movement of the frame section 7 along the arms 8 by rotation of the hand wheel 20 will effect raising and lowering of the pivot 23 and, accordingly, of the bar 24 supported thereby.

In order to control the pivotal position of the bar 24, a collar 26 is provided, slidable on the bar 24. A lever is mounted at its fulcrum 27 on the arms 21. One arm 28 of the lever extends upwardly and away from the arms 21 and is pivoted to the collar 26. The other arm 29 of the lever extends downwardly from its fulcrum 27. A link 30, preferably of adjustable length, is pivoted at its ends to one of the arms 22 and to the lever arm 29. Adjustment of the length of the link 30 adjusts the pivotal position of the bar 24. The angle between the lever arms 28 and 29 and the length thereof is such that, upon raising and lowering of the pivot 23, the pivotal position of the bar 24 remains constant. While such a constant pivotal adjustment is desirable, it is not essential to the ultimate broad objective of this invention.

A frame 31 is pivotally supported by the ends of the bar 24 for tilting sidewise over the bar 24. The frame 31 is constituted of a pair of plates 32, each pivoted at an end of the bar 24. The respective ends of the plates 32 are connected by facing channels 33. A table 34 is provided with four wheels 35 at opposite sides of the table, with the wheels movable in the channels 33. The table 34 is thereby movable lengthwise of the frame 31. On the under side of the table 34 is mounted a latch bar 36 for sliding transversely thereof, and a spring 37 is connected at its ends to the table 34 and to the latch bar 36 to slide the latch bar into latching position, as shown in Fig. 4, wedged between the channel 33 and one wheel 35. A toggle 38 is provided to withdraw the latch bar 36 from engaged position. One end 39 of the toggle 38 is pivoted to the latch bar 36. The other end 40 of the toggle 38 is pivoted to a bar 41, rigidly mounted with respect to the table 34.

One side of the frame 31 has secured thereto an adjustable length link 42, the end of which, remote from the frame 31, is secured to the free end of a bar 43. This bar 43 is secured to one of the arms 22, so positioned that the free end of this bar is below the pivot 23. By accurate positioning of the free end of the bar 43 with respect to the pivot 23, the angular position of the frame 31 about the bar 24 may be maintained substantially constant during raising and lowering of the frame 31 by the hand wheel 20.

In operation, with the jack in lowered position, the jack is rolled under the portion of a vehicle which it is desired to remove, and the jack is then elevated by turning the hand wheel 20. Upon turning thereof, the rod 10 approaches the bar 12 and the pairs of arms 21 and 22 elevate the pivot 23. The angular position of the table 34 is then adjusted to conform to the lower surface of the item to be removed from the vehicle, and that which is to be removed is then disconnected. The table 34 and the part supported by the table are then lowered by turning the hand wheel 20.

To reinstall that which is supported by the table, the operation is reversed. However, during installation, the exact alignment thereof may be obtained by adjustment of the links 30 and 42, and of the table 34 in the frame 31.

While I have described a preferred embodiment of this invention, it is to be understood that the specific structure may be departed from without departing from the spirit of my invention as disclosed herein and as defined in the appended claims.

Having now described my invention, I claim:

1. A transmission jack comprising a pair of associated frame members relatively movable toward and from each other, means for effecting relative movement of said associated frame members, pairs of arms pivotally connected at their lower ends to said frame members, bars slidable through said frame members, said arms being interconnected at their other ends by a pivot whereby said pivot moves vertically upon relative movement of said frame members, a bar mounted on said pivot perpendicularly thereto, a table mounted on said bar, a bell crank mounted on one of said pivotally interconnected arms at a point spaced from the pivotal mounting of said bar, means connecting one arm of said bell crank with said bar, a link connecting the other arm of said bell crank with the other of said pivotally interconnected arms at a point spaced from said interconnecting pivot, whereby said bar is maintained in such position that its longitudinal axis lies in a plane approximately perpendicular to said associated frame members even though it is tilted longitudinally, supporting means rigidly mounted on one of said arms, and a support pivotally connected to said table and said supporting means, whereby angular adjustment of said table in a direction transverse to said bar may be obtained, said support being adjustable to provide for leveling said bar.

2. A transmission jack comprising pairs of associated frame members relatively movable toward and from each other, means for effecting relative movement of said frame members, a pair of arms, each pivotally connected at its base portion with said frame members, the apical portions of said arms being interconnected by a pivot, bars connecting the frame members for relative sliding motion, a second bar extending longitudinally of said first bars above the latter and having a depending flange opposite its central portion, said flange being located beyond the apical portions of said arms and being pivotally connected to a support, and a support mounted for rocking movement of said second bar about the longitudinal axis of said second bar, said support being restrained against movement in one direction by a third bar rigidly connected to one of said arms.

3. A transmission jack, as defined by claim 2, further characterized by a collar slidable on said bar toward and away from said pivot, a bell crank mounted on one arm of one of said pairs of arms, a pivot connecting said bell crank with said collar, and a link connected with an arm of the other pair of arms, at a point on the last mentioned arm spaced from the aforesaid pivot between said arms and said bell crank for causing the collar to hold said bar in a position approximately parallel to said frame members when said frame members are moved toward and away from each other.

4. A transmission jack comprising a pair of relatively movable frame members, movable toward and away from each other, means for effecting relative movement of said frame members, a pair of arms pivotally connected at their lower ends to said frame members, respectively, said arms being interconnected at their upper ends by a pivot, whereby said pivot moves approximately vertically upon relative movement of said frame members, a bar, forming part of a frame, mounted on said pivot for pivotal movement about the axis of said pivot, a lever pivoted at an intermediate point to one of said arms at a point spaced from said pivot, a sleeve slidable on said bar and connecting one end of said lever with said bar, spaced from said pivot, whereby said frame may be turned about said pivot, adjustable link means pivotally connected with the other end of said lever and with the other arm at a point spaced from said pivot, whereby said bar is held in approximately horizontal position when said frame members are moved, one relative to the other, a second bar spaced laterally with respect to the vertical plane of said first bar and affixed at one end to move with one of said arms, and a stabilizing link connected between the other end of said second bar and the frame, at one side of the axis of said first bar, to cause turning of said frame about the longitudinal axis of said first bar.

CLARENCE F. HAMER.

References Cited in the file of this patent

UNITED STATES PATENTS

| Number | Name | Date |
|---|---|---|
| 1,257,169 | Yarbrough | Feb. 19, 1918 |
| 2,418,443 | Wiesner | Apr. 1, 1947 |
| 2,523,734 | Stephenson et al. | Sept. 26, 1950 |